United States Patent [19]
Sanders, Jr.

[11] Patent Number: 4,990,920
[45] Date of Patent: Feb. 5, 1991

[54] ELECTRONIC COUNTERMEASURE SYSTEM

[76] Inventor: Royden C. Sanders, Jr., Burton Hwy., Wilton, N.H. 03086

[21] Appl. No.: 483,946

[22] Filed: Apr. 6, 1983

[51] Int. Cl.$^5$ .............................................. G01S 7/38
[52] U.S. Cl. ........................................ 342/14; 342/15
[58] Field of Search ............ 343/18 R, 18 E; 342/13, 342/14, 15

[56] References Cited

U.S. PATENT DOCUMENTS

| | | | |
|---|---|---|---|
| 2,931,031 | 3/1960 | Deloraine et al. | 343/18 R |
| 3,618,096 | 11/1971 | Schoneborn | 343/18 E |
| 3,720,952 | 3/1973 | Lawsine | 343/18 E |
| 4,217,580 | 8/1980 | Lowenschuss | 343/18 E X |
| 4,823,139 | 4/1989 | Eisner et al. | 342/15 |

Primary Examiner—Gilberto Barron, Jr.
Attorney, Agent, or Firm—Davis, Bujold & Streck

[57] ABSTRACT

A radar jamming system comprises a target vehicle and a slave vehicle. A master thread radar detection system is provided in the target vehicle and a slave transmitter system in the slave vehicle with a data link between the target vehicle and the slave vehicle. A threat analyzer is carried by the target vehicle, the threat analyzer being capable of measuring the distances between the target and thread radar as well as between the target and slave vehicle and includes means for calculating a suitable time delay signal and doppler shift for masking the target. The signals are transmitted to said slave vehicle by the data link and means carried by the slave vehicle under control of the data link generate and transmit a radar pulse having the calculated time delay and doppler shift. The signal emitted from the jammer is coincident with the signal reflected from the target in both time and frequency.

12 Claims, 4 Drawing Sheets

ELECTRONIC COUNTERMEASURE SYSTEM

BACKGROUND OF THE INVENTION

As radar systems become more sophisticated, it becomes increasingly difficult to generate countermeasure signals which will confuse one or more threat radars and enable a target vehicle to penetrate a modern defense system or avoid a radar guided missile. This is particularly true when the threat radars employ techniques such as pulse-to-pulse encoded, chirp, and/or frequency agile monopulse.

SUMMARY OF THE INVENTION

The new system uses a low cost expendable remote jammer which is deployed in such a way that it is between the target and the threat radars being jammed i.e. inboard. The jammer is electronically linked to the target vehicle by a low probability of detection secure data link. The jammer acts as a simple repeater except it adds a command specified delay so that the transmitted pulse exactly masks the target at the threat radar receiver. In addition the jammer changes the transmitted frequency so that it exactly matches the doppler of the target return. The target can command the jammer to address up to say ten or more threat radars in a single threat band channel per jammer module and each cover pulse will match the target pulse with say 50 nanoseconds to spare and will match the doppler frequency to less than the doppler filter width in the threat radar or say less than ten cycles.

The data link measures the distance between the jammer and the target. The data link also commands the delay and the doppler that the jammer must give each threat radar pulse. The master unit in the target measures the difference in the time of arrival of the pulse that arrives directly from the threat radar and the pulse that is relayed by the jammer. The geometry of the situation and the formulas for calculating the delays and doppler shifts required by the jammer is given by FIG. 1. The accuracy of these formulas and the ability of the master unit to measure these quantities accurately is an important part of this new system.

This system is capable of providing protection to ships, aircraft, missiles, and space vehicles. The exact method of implementation depends on the vehicle protected and the operational scenario. However, in all these cases, we will have an offboard jammer (usually between the target and the threat radar) which we will call the slave, remote, or jammer unit and the equipment on the target vehicle, the master unit.

Angle Deception

The major function of the system is to mask the radar return of the target and, very fundamentally, angle deny or deceive the threat radar. Range gate pulloff is very easy to accomplish but is not really desirable as long as angle denial or deception is being achieved. One of the advantages of the angle denial method of jamming is that the threat radar under some implementations has no way of knowing it is being jammed.

Emmiter Location

By measuring the angle between the threat radar and the jammer and the difference in the time of arrival of the direct and relayed signals (which we are already measuring for the jammer), the distance to the threat radar can be accurately calculated. This is very useful in meaningful threat evaluations and making proper decisions about the jamming program, launching of additional jammers, etc.

Non-Cooperative Bi-Static Detection

This jamming system is capable of passive detection of certain airborne vehicles (particularly missiles aimed at the target). The long base line to the target is very useful in separating and measuring the range of the missiles aimed at the target, which would be very nearly in the line of sight between the threat radar and the target and otherwise their echo would be very close to the direct pulse from the threat radar and impossible to get very accurate measurement of range. This information is very useful in that, if you detect a semi-active threat missile, you can generate the correct masking pulse for the missile as well as the threat radar. If you detect IR threat missiles, you can launch IR decoys at exactly the correct time. Other targets can be detected bi-statically in the conventional manner.

BRIEF DESCRIPTION OF THE DRAWINGS

In order to more fully understand the present invention, reference should be made to the following detailed description in connection with the accompanying drawings wherein.

DETAILED DESCRIPTION OF THE INVENTION

Figure 1:
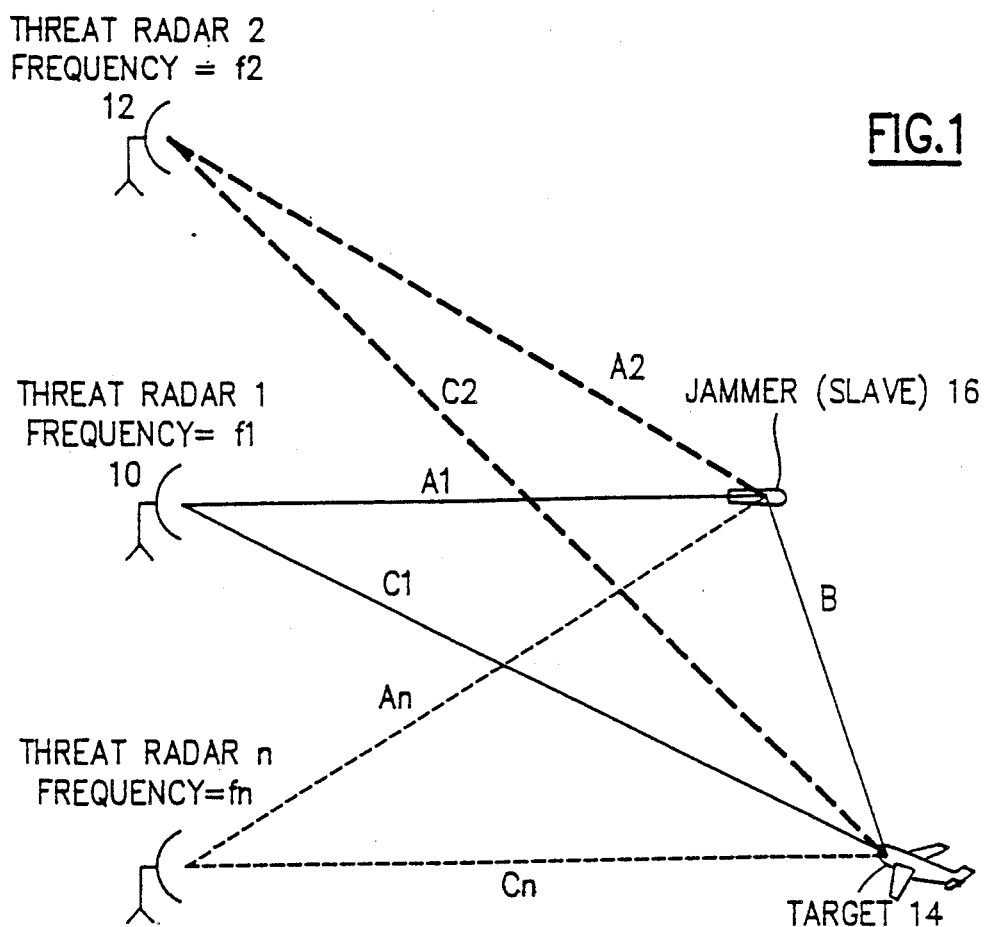
FIG. 1 is a diagramatic schematic illustration of the target vehicle in relation to several threat radars and the slave jammer.

Referring now to FIG. 1 there is illustrated a schematic diagram of two threat radars 10 and 12, radar 10 operating at a frequency of f1 and radar 12 operating at a frequency of f2. For the purpose of discussion, assume that both of these threat radars measure the delay time of the return signal from target 14 and the doppler shift in the signal. Also shown in FIG. 1 is a slave jammer (vehicle 16) containing slave jamming modules which send out a separate jamming signal for each threat radar.

For threat radar 10 the distance from the radar 10 to the target 14 is shown as C1, the distance from radar 10 to jammer 16 is A1, and the distance between jammer 16 and target 14 is B. The corresponding distances for the second threat radar 12 are A2, C2 and B and the Nth threat radar is An, Cn, and B..S For convenience of discussion throughout the specification and claims the following symbols shall have the following meanings:

A—the distance between the threat radar and the slave jammer vehicle.
B—the distance between the slave jammer vehicle and the target vehicle.
C—the distance between the threat radar and the target vehicle.
$<A$ = the angle between the slave vehicle and the threat radar as measured from the target vehicle.
Df—the difference in frequency between that of the threat radar signal received directly from the threat radar and the frequency of the radar signal retransmitted from the slave.

$D_{do}$—the delay in receipt of the threat radar signal as retransmitted by the slave and that received directly from the threat radar without any added delay.

$D_{df}$—the delay in the receipt of the threat radar signal as retransmitted by the slave and that received directly from the threat radar after the proper delay is introduced to mask the target.

$D_p$—the doppler shift given to the jammer transmissions so as to match the doppler of the target as received by the threat radar.

$D_s$—the delay given to the transmitted signal from the slave jammer so as to mask the signal received from the target at the threat radar.

f—the instantaneous frequency of the threat radar.

Each signal will have a subscript (e.g. 1,2,n) which identifies the particular threat radar for which the value is measured or calculated.

Refering still to FIG. 1, the electronic system on board target 14 (detailed in FIG. 2) is arranged to make the following measurements and calculations:

a—measure $D_{do}$—which is the difference in time for the transmitted pulse from 10 to reach target 14 by traveling along C and the pulse traveling to A and being retransmitted along B without any added delay.

b—measure difference frequency Df, (relative doppler) between signals which arrive along the two paths (e.g. C and A+B).

c—measure <A, —which is the angle subtended by the distance A (e.g. the angle between C and B).

d—measure distance B by normal repeater techniques.

e—measure doppler dB/dt on the signal from the slave jammer 16 along path B to target 14.

f—measure $D_{df}$ which is the difference in time for the transmitted pulse from 10 to reach target 14 by traveling along C and the pulse traveling to A and being transmitted along B with added exact delay to mask target.

From the above measurements the following calculations are made:

Calculate Ds using the formula $D_s = 2B - 2D_{do}$
Calculate Dp using the formula $D_p = dB/dt - Df$
Calculate the distance C by using the following formula $$C = D_{do}(2B - D_{do})/[2B(\cos A - 1) + 2D_{do}]$$

where $D_{do}$, B, and <A are as described above

We then transmit values of all Ds and Dp to the jammer 16 which then controls the added time delay and frequency shift of the signal retransmitted from 16 to the threat radar 10.

We then monitor in the master unit to see if these values of delay and doppler have been added to the jammer signal. The new measured $D_{df} = 2B - D_{do}$ and the measured doppler = dB/dt.

Since we retransmit the threat signal without demodulation in the jammer, it makes no difference to the effectiveness of the jammer what form of pulse-to-pulse coding or chirp is being used by the threat radar.

Since the signal coming back from the jammer is coincident with that from the target in both time and frequency and at the wrong angle, the radar 10 measures a false angle to the target even though it has the correct range. Since the stronger signal is actually coming back at the wrong angle there is nothing that the radar can do to correct this error.

The same measurements are made with respect to threat radar 12 and calculations are made as above to obtain delay Ds2 and doppler shift Dp2 to be added to the signal to be sent to the threat radar 12 by jammer 16.

If there are n threat radars, n sets of measurements will be taken and Dsn and Dpn will be calculated and applied to the jamming signal.

$D_{do} = A + B - C$ AS MEASURED AT TARGET.
$Df = dA/dt + dB/dt - dC/dt$ AS MEASURED AT TARGET.
$dB/dt - Df1 = Dp1$,   $dB/dt - Df2 = Dp2$, . . .
   $dB/dt - Dpn = Dpn$.
$2(B - D_{do1}) = Ds1$,   $2(B - D_{do2}) = Ds2$, . . .
   $2(B - D_{don}) = Dsn$.

TARGET SUPPLIES JAMMER WITH VALUES OF Ds1, Ds2, Dsn; Dp1, Dp2, . . . Dpn AS WELL AS BANDWIDTH, GAIN, AND CENTER FREQUENCY.

JAMMER REPEATS THREAT 1 SIGNALS WITH DELAY OF Ds1 AND ADDED DOPPLER OF Dp1.

JAMMER REPEATS THREAT 2 SIGNALS WITH DELAY OF Ds2 AND ADDED DOPPLER OF Dp2.

JAMMER REPEATS THREAT n SIGNALS WITH DELAY OF Dsn AND ADDED DOPPLER OF Dpn.

Figure 2B:
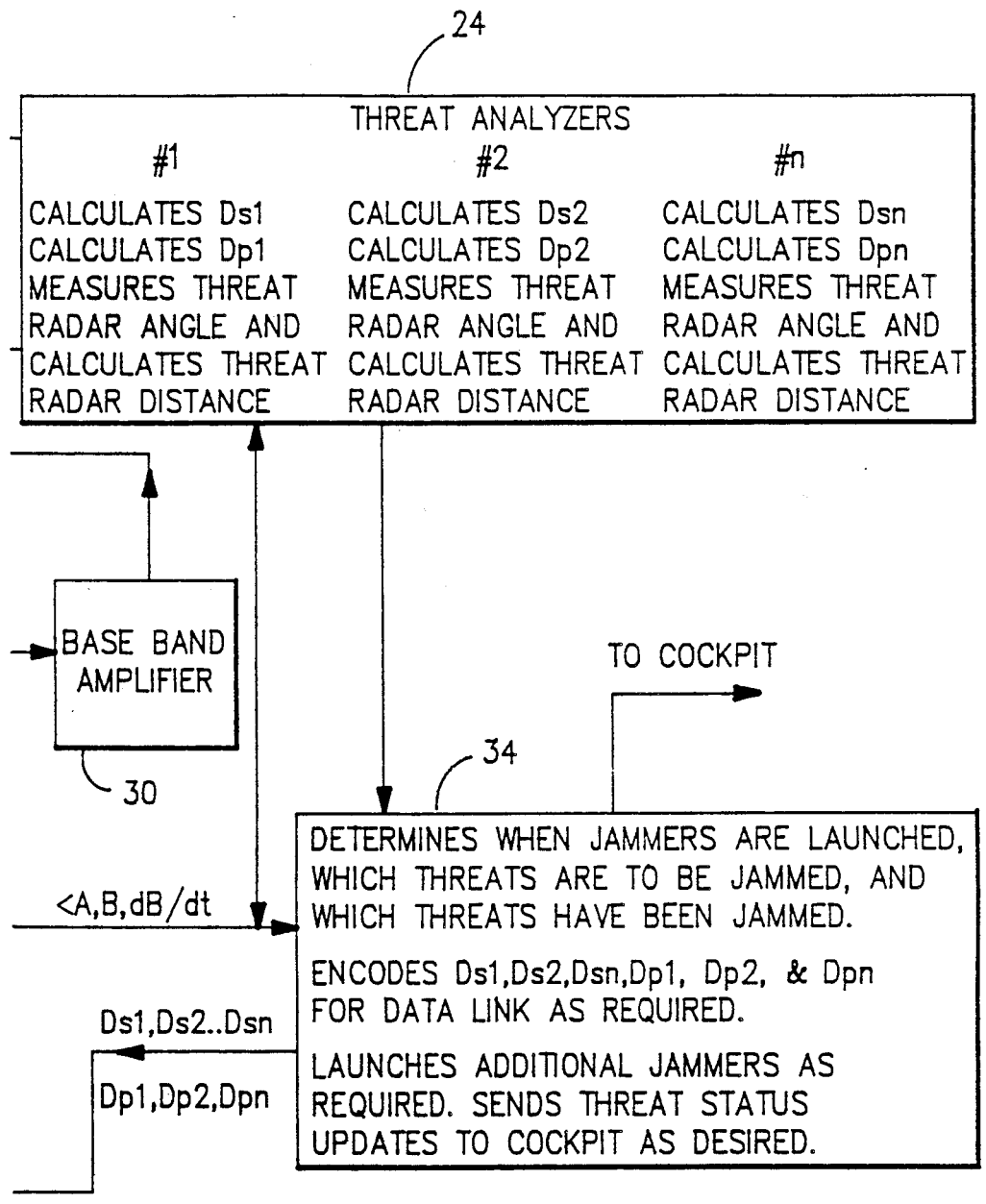
FIGS. 2A and 2B are diagramatic schematic representation of the functional electronics and data processing modules in the master electronic system carried by the target vehicle.
Figure 2:
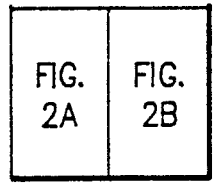
Figure 2A:
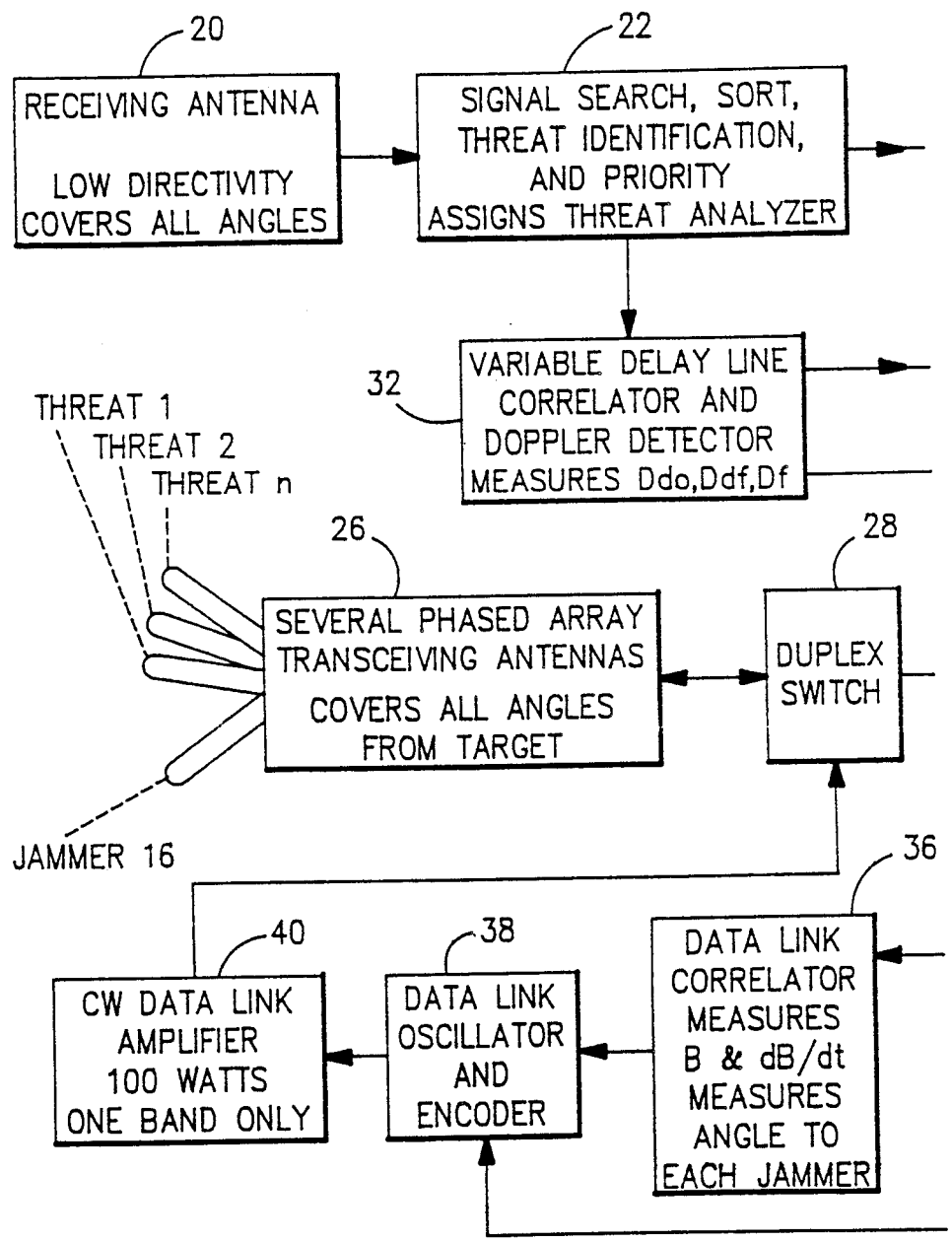

Referring now to FIG. 2, there is shown a schematic diagrammatic view of the electronic system on board the target 14 for making the measurements and calculations discussed above and communicating the appropriate commands to the slave (jammer) vehicle 16 (FIG. 1).

The system comprises a receiving antenna 20 which has low directivity and covers all angles. A suitable antenna is any microwave antenna having an omnidirectional pattern and covering the threat radars' bandwidth. It may be necessary to use two or more antennas suitably combined to cover all angles and bandwidth. The signal received by antenna 20 is fed to a signal search, sort and threat identification system 22 which identifies the Threat Radar Signal, assigns a priority to the signal and transmit the signal to one of several threat analyzers 24.

The operation of the low directivity Threat Radar Receiving Antenna and Signal Search, Sort, and Threat Evaluation is basically the state of the art as used by ASPJ and current Radar Warning and Homing Equipment. The operation of these circuits determines those threat radars that are currently threatening the target, their order of priority, and assigns a threat analyzer to each current threat. When the jamming commences, these circuits will monitor the effectiveness of the jamming, monitor for the appearance of new current threats, and reassigns threat analyzers as required.

Also provided are several phased array transceiving antennas 26 arranged to receive threat signals from each threat radar and communicate with jammer 16. These phased arrays permit measurement of the angles <A, <A2, <An between the respective threat radars and the jammer vehicle 16. The received signals from antenna 26 are passed through a duplex switch 28 to a base band amplifier 30. From amplifier 30 the signals are fed to two correlators 32 and 36. Correlator 32 is a variable delay line correlator and doppler defector which measures delay Ddo and frequency shift Df. The measured values of Ddo and Df for each threat radar signal are then fed into the appropriate threat analyzer 24. The data link correlator 36 measures distance B and the doppler dB/dt. This correlator 36 also measures the angle <A to each jammer 16 from the target vehicle. The measured values of distance B and the doppler shift dB/df for each threat signal is also fed to the appropriate threat analyzer 24 which calculates Ds and Dp for each threat radar signal by using the equations:

$$Ds = 2B - 2Ddo$$

and $Dp = dB/dt - Df$

The threat analyzer also calculates the distance C to each threat radar using the equation:

$$C = Ddo(2B - Ddo)/[2B(CosA - 1) + 2Ddo]$$

The action portion 34 of the data processing system determines when each jammer 16 is to be launched, which threats are to be jammed and which threats have been jammed. It also encodes Ds1, Ds2, Dsn (the delay for each threat radar signal) and Dp1, Dp2, Dpn (the doppler shift for each radar signal). These encoded signals are then fed back to a data link oscillator 38, the amplifier 40, the duplex switch 28 and to the antenna(s) for communicating with the appropriate jammer(s) 16.

The action portion 34 also launches additional jammers as required and sends threat status updates to the cockpit.

Figure 3:
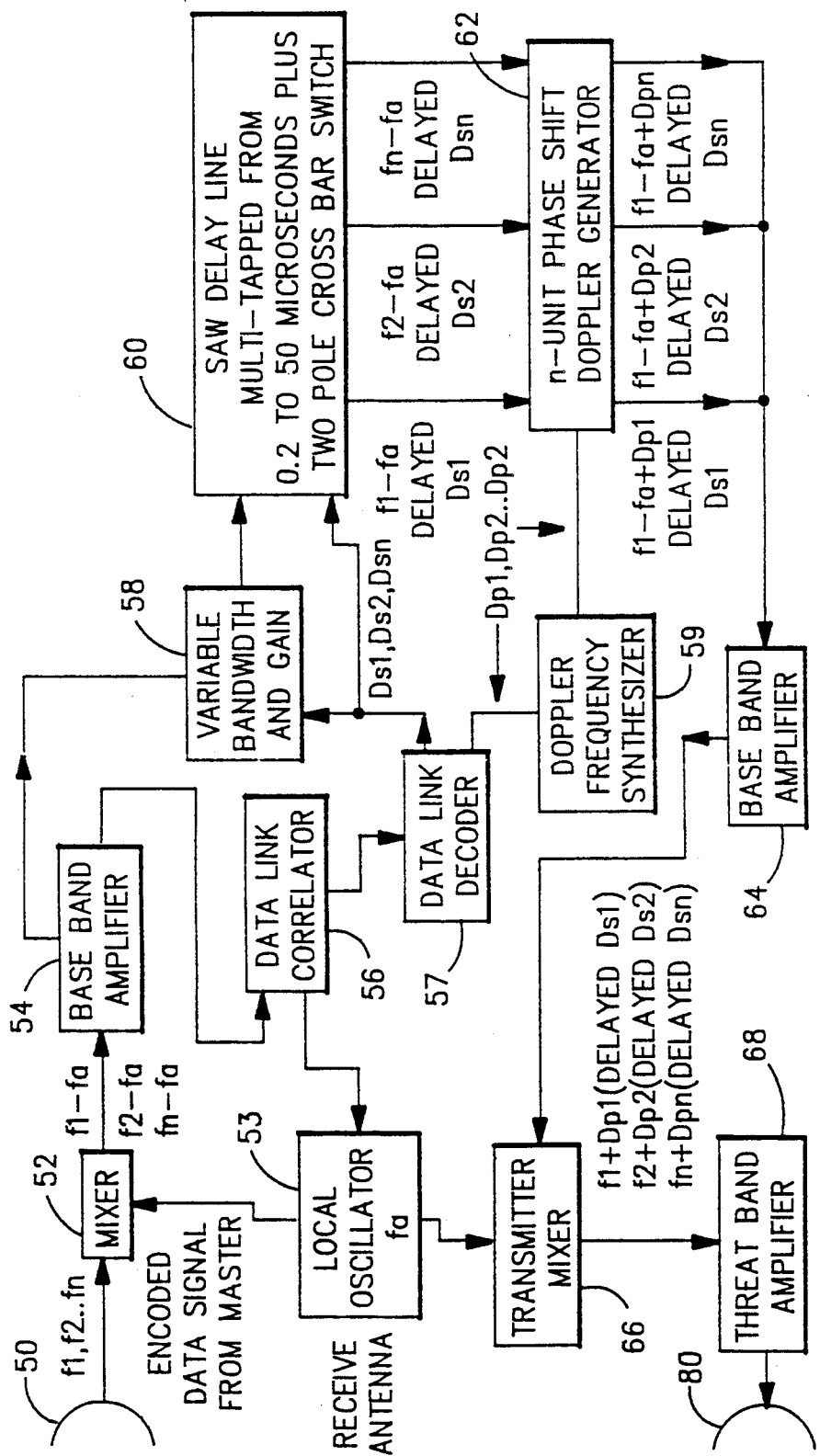
FIG. 3 is a diagramatic schematic representation of the electronic system carried by the slave jammer.

Referring now to FIG. 3 there is shown a schematic diagram of a preferred slave electronic system for receiving and retransmitting radar signals from one or more threat radars under control of the encoded data transmitter from the master data processing system in the target 14. The slave (jammer) system includes an antenna 50 for receiving the various threat radar signals f1, f2, fn to be jammed. It also receives the data link signal from the master data processing system. The received signals are fed to a mixer 52 which also is fed by a local oscillator 53 which generates a separate frequency fa. The difference signals f1−fa, f2−fa, fn−fa are fed from the mixer to a base band amplifier 54. The amplified signals are fed to a data link decoder 57 and a variable band width and gain amplifier 58. The Data link decoder sends appropriate band width and gain control signals from the master data processor to the variable band width and gain control circuit 58. The amplified signals from 58 are fed to the delay line 60. The Data link decoder also sends the values of the delay signals Ds1, Ds2, and Dsn to the delay line 60 which sets the position of the delay taps.

The delay line 60 will produce a number of signals corresponding to the number of threat radar signal received. The output from the delay line will thus be:

f1−fa delayed by Ds1
f2−fa delayed by Ds2
fn−fa delayed by Dsn

The data link decoder 57 also sends the decoded values of Dp1, Dp2, and Dpn to a doppler frequency synthesizer 59 which generates the appropriate frequencies of Dp1, Dp2, and Dpn which are fed (along with the outputs of the delay line 60) to a phase shift doppler generator 62 whose output signals are f1−fa+Dp1 (delayed Ds1)
f2−fa+Dp2 (delayed Ds2)
fn−fa+Dpn (delayed Dsn)

These signals are fed to a base band amplifier 64 and a transmitter mixer 66 also fed by the local oscillator 53. The signals from the mixer are as follows:

f1+Dp1 (delayed Ds1)
f2+Dp2 (delayed Ds2)
fn+Dpn (delayed Dsn)

These signals are fed to a threat band amplifier 69 and then to the transmitting antenna 80 where the target echo is returned to each threat radar the target echo having been delayed by the calculated Ds and having been given the appropriate Dp to mask the real target and give each threat radar a false target.

While the threat analyzers 24 of FIG. 2, are shown as a separate block, they actually will only be a module of a software program. When a threat analyzer has been assigned to a threat radar, it will first measure Ddo, Df, and the angle of arrival of the signal. It will then calculate the distance to the threat which will greatly help to evaluate the urgency of the threat. If any of the threats are immediate it will automatically launch the jammer or jammers required. It then calculates Ds and Dp required for the jammer to generate a masking pulse for the target and transmits these values to the jammer by means of the data link. When the jammer starts jamming the threat radar, the values of Ds and Dp as delays and doppler shifts, are introduced into the jammer. The threat analyzer checks to see if they are proper to generate the correct masking pulse and, if incorrect, sends correction commands to the jammer.

The threat analyzer will continuously subtract the added Ds and Dp on the jamming so that it can continously calculate the correct Ds and Dp, changing these values as necessary to compensate for changed relative positions at the threat radar, target and jammer.

When there is more than one threat radar to be jammed simultaneously the jammers delay unit creates multiple delays for each signal that it receives. So, for example, if we were jamming 7 threat radars, each signal would be repeated with 7 different delays, only one of which has the correct delay to give the proper masking pulse. The other 6 signals, that are repeated for each threat will do no harm to the jamming and will not degrade the jam to signal ratio since the jammer's transmitter duty factor is from 40 to 100%. It just might cause some bonus confusion in the threat radar.

However, if any of these threat radars are narrow band pulse doppler radars, then multiple doppler shifts become much more important. Since each doppler is added at a separate delay tap with a phase shift doppler generator, this will only affect the jammer transmitter's duty factor but not the jam to signal ratio at the threat radar. Since we can measure the signal strength of the threat radar and we have calculated the distance to the threat radar, the master unit is able to accurately calculate how many threat radars to assign to a single jammer and consequently determine when to launch additional jammers.

Because the jammer is a simple repeater and simply introduces delays and doppler shifts in the repeated signals, the jammer does not care what form of pulse-to-pulse encoding or frequency shift the threat radar uses and their use does not affect the effectiveness of the jamming. Similarly, pulse chirping does nothing to degrade the jamming. The jammer is completely unaware of the nature of the pulses it is repeating.

The angle jamming that is created at the threat radar occurs because two coherent signals arrive at the threat radar. One from the target at the correct angle and one from the jammer at the incorrect angle. Since the two signals are coherently the same there is no processing that the threat radar can do to separate them. Since the jamming signal is stronger than the target signal, the threat radar measures the wrong angle and will follow the jammer. The threat radar, in most instances, will not be aware that it is being jammed, but if and when he becomes aware, there is nothing he can do but try to reacquire the real target if the jammer were to separate enough from the target so that the target was outside the main tracking beam.

If the jammer vehicle is sufficiently controllable in speed and position, then the jammer vehicle would be manuvered back into the main beam and the jamming would again be effective. If the jammer is jamming multiple threats from diverse enough directions it will ultimately be impossible to keep the jammer in the main beams of all the threats. If the jammer vehicle is not controllable, the target will be out of the main beam much sooner. When this occurs, the threat radar might reacquire the target. However, the jammer still looks like a real target to the threat radar and will continue to occupy the enemies defensive forces. The enemy has no way of knowing that the jammer is not a true target and its range and doppler can be controlled in such a way as to tie up defensive forces for the maximum time. The other option for a jammer outside of the main beam is to become a side lobe jammer.

In a preferred form of the invention, the jammer 16 consists of an aerodynamic body several inches in diameter containing a battery power supply, optional propulsion, and sufficient weight to give the jammer the desired trajectory. The desired trajectory would put the jammer between the target and the Threat Radar for as long as possible. An optional and desirable configuration would be to give the jammer vehicle enough propulsion to stay between the target and the threat radar as long as possible and make the vehicle manueverable and controlled by the target to stay in the main lobe as long as possible.

If the jammer vehicle 16 is of the non-manueverable type and the threat radars are forward of the target's course, it will be fired forward so as to be able to coast in the desired inboard profile as long as possible. If the threats are to the side, the jammer will be fired to the desired side, so as to be able to stay inboard of the target as long as possible. If the threats are to the rear, the propulsion will not be used immediately and the jammer will naturally stay in an inboard profile for a long time.

The Jammer Vehicle 16 will be designed to accept more than one, say six, jammer modules. These jammer modules will be on a silicon chip, say 2" by 4", which will be inserted in the jammer body with say ¼" of the jammer module card protruding from each side of the body. The transmitter and receiving antennas 50 and 80, which will have an omnidirectional pattern, will be part of the protuding edges of the jammer module. The microwave parts of the jammer module will be silicon monolithic hybrid on one side and the digital parts and the connections to the delay line, power supply and mother board on the other side will be interconnected with appropriate feedthroughs.

The digitally controlled delay line 60 will be either a SAW or Bulk type delay line connected to a two pole cross bar switch. It will be mounted on the mother board, by which it is connected to the module. The final transmitter amplifier 68 and driver will use the best of existing conformal technology.

The multiple Jammer Modules will be designed to operate independently of each other under the control of the Master Unit. Within limits any jammer module could be programmed by the master unit to cover any 750 to 1000 megahertz in an octave band. The bandwidth will be programable so that it could be narrowed by command in certain bi-static and dense signal environments.

Only one of the Jammer Modules on each slave vehicle 16 will have the Data Link Correlator 56 and Decoder 57. The data link signals will be sent to the other Jammer Modules through the mother board.

The Jammer is launched from the target aircraft 14 or chip when the threat evaluator shows that the target is being tracked by a threat radar 10 and possibly that a threat missile has been launched. The jammer is provided with enough propulsion and is launched in the right direction so that the jammer will be between the target and the threat radars for the maximum length of time. As a result of the jamming the threat radars 10, 12 will follow a centroid that is very close to the jammer rather than the target 14. When the jammer has separated from the target sufficiently the target 14 will sense that it is out of the main beam. The enemy's acquisition radars may pick up the target 14 as a new target and take action against it. The threat radar 10, unless specially equipped, will have no way of knowing that the jammer is not a real target. As a result, the semiactive missle will follow the jammer 16 rather than the target 14. If the target senses it has been reacquired by the threat radar 10 it launches another jammer 16 and the process is repeated. Using non-cooperative bi-static detection and tracking, the missile can be tracked and the jammer turned off, as the missile nears interception. If the jammer 16 were manueverable it might be manuevered back into the main beam and the process repeated. The jammer might also be useful in jamming other threats in other sectors as it drifts back or simply maintained as a valid target to tie up the enemy's defenses. Another option is to pop a parachute and deploy an inflatable directive antenna and start jamming through the side lobe jamming mode.

The jammer 16 might be configured so as to simultaneously jam the search and acquisition radars. In this case it might be advantageous to continue to jam these radars even after the threat radar 10 has reacquired the target 14. Even after the target 14 has passed the jammer 16 and stand in jamming is no longer possible, it may be advantageous to use the jammer as a false target generator.

The advantages of this method of main lobe jamming are as follows:
  1—less than 1 watt of (transmitter-antenna gain) power is required for main lobe jamming. A great deal of the progress that is being made on conformal elements for phased array antennas is applicable to the transmitter section of the jammer.
  2—No antenna gain is required on the jammer
  3—To date, no present or future radar technology has been suggested that would subvert this type of jamming. As a result, this type of jamming would be much less dependent on the latest intelligence data about the enemies radar or missile system.
  4—The cost of this type of jammer would be very low.

a—One proposed plan calls for building the entire module on a 2" by 4" silicon monolithic hybrid. The bandwidth that a single module would cover depends on the technology available and the threat density.

b—The jammer body, propulsion, battery, and power supply would be very low cost.

In a preferred form of the invention the elements 22, 24, and 34 of FIG. 2 are similar to those used in ASPJ or AJQ-126 system wherein the various data processors, in addition to their normal functions, are programmed to do the simple calculations of appropriate delay Ds, doppler shift Dp and distance C.

The encoding of the calculated values uses a standard digital code system for preparing data for transmission in digital form. The variable delay line correlator 22 may be built using a MIPS Model 112 or 119 manufactured by Whittaker Tasker Systems. Chatsworth, Ca. or a multitapped SAW delay line manufactured by Andersin Laboratories, Bloomfield, Conn. The data link correlator 36 is similar to the programable SAW correlator PSC-120-30-4 manufactured by Anderson Laboratories. The phased array transceiving antennas can be a HB phased array antenna manufactured by General Electric, Utica, N.Y. The other elements of the electronics systems use standard technology.

In the electronic system of FIG. 3, the various elements identified are state of the art technology involving standard components. For example, the data link correlator 56 may be a similiar to programable SAW correlator PSC-120-4, manufactured by Anderson Laboratories, which would include the data link decoder 57 and the SAW delay line can be a multitaped SAW delay line by Anderson Laboratories mated with a custom two pole cross bar switch designed as a custom silicon chip. As mentioned previously these various elements, to the extent possible, are embodied on a silicon monolithic hybrid.

The above describes only one form of the invention. Several useful variations are described below to show its broad application.

Droid Mainlobe Jamming Mode

In this mode of operation, the jammer is carried in a RPV which has the same speed as the target. During the engagement with the threat radars it flies a very loose formation with the target but positioned so as to be still in the main beam, closer in range to the threat radars than the target, and separated laterally or vertically so as to be at a different angle to the threat radar than the target. During an engagement with a threat radar and an enemy missile, the amplitude of the jamming signal would be varied to give apparent angle modulation so that the missile would miss both the target and the jammer. It is important that the RPV be of a stealth design so that it would be difficult for the threat radar to skin track the jammer.

The mode of operation would otherwise be similar to the main lobe jammer described above. The jammer vehicle could be a Cruise type missile or other suitable RPV that would have the warhead removed and would carry as many slave jamming modules as necessary to handle the threat density expected. In this case, a 250 watt CW amplifier would amplify the output of the jammer modules. This would give the jammer the ability to still mask the target and thus angle jam even in the side lobes of the threat radar so that it could act as a side lobe jammer as desired.

Side Lobe Jamming Mode

The side lobe jamming mode is similar to the main lobe jamming mode expect that additional power and antenna gain is used to get through the threat radar side lobes say 30 db. The effect on the threat radar is different in that the angle measurement becomes so much in error that the enemy will probably know immediately that he is being jammed. In effect, the threat radar is denied any angle information at the targets range and doppler at any angle.

One form of a side lobe jammer is the Droid Cruise missile described above which can be used either as a main lobe jammer or side lobe jammer. Another useful form is to deploy the jammer modules in a ballistic rocket launched vehicle such as 5" Mark 71-Mod 1. A parachute or balloon would be deployed in the vicinity of the threat radars. In this case the 250 watt CW amplifier must be used or directive antennas aimed at the threat radars, having sufficient gain to overcome the sidelobe supression of the threat radar, must be used.

Since the enemy will try to shoot down the side lobe jammers by home-on-jam techniques, it is desirable to use two side lobe jammers simultaneously both jamming the same threat radars. By varying the relative amplitude of the two jammers at the pitch resonant frequencies of the homing missile as modified by the lead angle computation each 180 degrees out of phase with each other, it will be cause the enemies missiles to miss both jammers.

Stand In Jammer

When a side lobe jammer is deployed so close to the threat radar that no additional CW amplifiers or antenna gain need to be used (less than 2 miles), the jammer can be used in a Stand In mode. In this mode, the jammer only jams the threat radar that it is near but does so for all the targets that are in the area.

Stand Off Jamming

Stand Off Jamming utilizing this technique is limited to those non-sophisticated threats that do not use pulse-to-pulse coding and whose pulse repetition rate are reasonable predictable. There is a lot of these radars in existence today. Therefore it might be desirable in some scenarios to utilize Stand Off Jamming as a way of taking care of the non-sophisticated threats so that the Main Lobe and Side Lobe Jammers would have less threat radars to handle.

The Stand Off Jammer would:

1—Be housed in a separate aircraft, balloon, or RPV that stayed behind the main action in certain scenarios.

2—Limited to those threats that do not use pseudo-random pulse coding or where a successive pulse if properly delayed and properly timed would still confuse the threat radar.

3—Would use a phased array antenna that would put a beam on each threat and use as much transmitter power as was available say 250 watts CW. It would jam thru the side lobes of the threat radars.

4—It would use the same system as the Main Lobe Jammer or Side Lobe Jammer except that the next pulse repetition rate would be estimated and the return pulses spread in time to cover the uncertainty.

5—With a big enough phased array antenna, this system could be quite effective against certain threats and the jammer could stand back in a relatively safe place and protect many aircraft.

6—Many variations are possible depending on the scenario:

a—Jam all non-sophisticated threats with Stand Off Jammer and use Main lobe Jamming on sophisticated threats.

b—Maximum complexity can be put on either the target aircraft or the stand off aircraft.

Ship Defense Jammers

The operation of Ship Defense Jammers is quite similiar to that described for the defense of airborne vehicles. The ship is a much larger target and as a result directive antennas must be used and the transmitter power must be increased to possibly 250 watts CW.

The master unit is almost if not identical. The jammer on the other hand must be quite a bit bigger both because of the directive antennas required as well as the increased transmitter power.

RPV's such as the "Albatross" would be deployed around the ship or ships and would contain built directive arrays. The array might be a conformal array in which case the transmitters would be contained within the array or the transmitter might be a 250 watt CW TWT.

Another possibility would be to use rocket launched projectiles that would deploy the jammers at the time of an attack. When the jammer was in the proper position a ballon or parachute would be deployed. The directive antenna could possibly be inflatable.

It is important in all these cases to use the jammer in the main lobe jamming mode. Another good possibility would to mount the jammer in a small 30 foot pilotless boat which would be controlled so as to ride in formation away from the ship but near enough to be in the main beam of the threat radars.

I claim:

1. A radar jamming system comprising a target vehicle and a slave vehicle, a master threat radar detection system in the target vehicle and a slave transmitter system in the slave vehicle, a data link between the target vehicle and the slave vehicle, a threat analyzer carried by the target vehicle, said threat analyzer being capable of measuring the distance between the target vehicle and slave vehicle, means for calculating a suitable time delay signal and doppler shift for masking the target vehicle, said signals being transmitted to said slave vehicle by said data link, and means carried by said slave vehicle under control of the data link for generating and transmitting a radar pulse having the calculated time delay and doppler shift so that said pulse is coincident in both time and frequency with the target signal.

2. An electronic countermeasure system carried by a target vehicle for threat detection and analysis and for control of radar signals to be emitted by a slave vehicle, said system comprising a receiving antenna and several transceiving antennas for receiving one or more separate threat radar signals, means for measuring and calculating with respect to each received signal, the distance between slave vehicle and target vehicle and the difference frequency Df and the time difference of arrival Ddo between the signal which arrives direct from threat radar and the signal which is relayed by the slave vehicle, means for calculating with respect to each threat radar signal the necessary delay and doppler shift of a radar signal sent from the slave to mask the return signal from the target vehicle, and means for transmitting to the slave vehicle appropriate signals regarding delay, doppler shift, bandwidth, gain and center frequency for signal to be transmitted by the slave vehicle so that said pulse is coincident in both time and frequency with the target signal.

3. A master radar countermeasure system comprising means for searching and receiving radar signals from a number of threat radars, means for determining which threat radars are in need of jamming and their order of priority, a separate threat analyzer for each of said threat radars, each threat analyzer being arranged to measure and calculate; the distance between slave vehicle and target vehicle and the rate of change of the measured distance and means controlled by the threat analyzer for utilizing a slave vehicle containing a jammer, means in the threat analyzer for calculating the shift and delay necessary for the jamming signal so that the jamming signal is coincident with that from the target vehicle in both time and frequency to mask the target signal, and means for transmitting the calculated control signals to the slave vehicle.

4. A slave vehicle radar jamming system carried by a slave vehicle for receiving control signals from a target vehicle, comprising a data link decoder, a variable delay line, a doppler frequency synthesizer and means for combining a predetermined delay and doppler shift to a radar signal to be transmitted from the slave vehicle, said last means being controlled by the data link decoder, said delay and doppler shift providing a signal that is coincident in both time and frequency with the target signal.

5. The system of claim 1 wherein the signal emitted from said slave vehicle is coincident at the threat radar with the signal reflected from the target vehicle in both time and frequency so as to mask said target vehicle.

6. A Master radar countermeasure system comprising means for searching and receiving radar signals from a number of threat radars, means for determining which threat radars are in need of jamming and their order of priority, a separate threat analyzer for each of said threat radars, each threat analyzer being arranged to measure and calculate:

(a) the distance B between slave vehicle and target vehicle (b) delay distance Ddo which is the time difference between direct signal arrival and arrival of the signal retransmitted from slave vehicle (c) rate of change dB/dt of distance between the slave vehicle and target vehicle (d) difference frequency Df between the direct signal and the signal retransmitted from the slave vehicle means for transmitting the calculated doppler shifts and delays to the slave vehicle and means on the slave vehicle for retransmitting the received threat radar signal with the same frequency, code, if any, and duration with said calculated doppler shifts and delays superposed on the retransmitted threat radar signal, so that the retransmitted threat radar signal emanating from the slave vehicle appears to the threat radar to be coincident and identical in phase, coding, and time to the reflected threat radar signal from the target vehicle, the signal from the slave being stronger than that from the target and being angularly spaced therefrom.

7. An electronic countermeasure system carried by a target vehicle for threat detection and analysis and for control of radar signals to be emitted by a slave vehicle, said system comprising a receiving antenna and several transceiving antennas for receiving one or more separate threat radar signals, means for measuring with respect to each received signal:
  (a) the difference in time (Ddo) for the transmitted threat radar pulse to reach the target vehicle directly as compared to that retransmitted by the slave vehicle
  (b) the doppler (dB/df) in the signal from the slave vehicle to the target vehicle
  (c) the angle (<A) between slave vehicle and threat radar as measured from target vehicle
  (d) the difference frequency (Df) between signals which arrive directly from the threat radar and the signal retransmitted from the slave vehicle means for calculating Dp and Ds and C using the following equations:
Calculate Ds using the formula Ds=2B−2Ddo
Calculate Dp using the formula Dp=dB/dt−Df
Calculate the distance C by using the following formula $$C = Ddo(2B - Ddo)/[2B(Cos < A - 1) + 2Ddo]$$

Where:
  Dp is the doppler shift given to the jammer transmission from the slave vehicle so as to match the doppler of the target vehicle as received by the threat radar
  Ds is the delay given to the transmitted signal from the slave vehicle jammer so as to mask the signal received from the target vehicle at the threat radar
  C is the distance between the target vehicle and the threat radar
  the transmitted signal from the slave vehicle being coincident in both time and frequency with the target signal.

8. The system of claim 6 wherein Ds, the delay given to the transmitted signal from the slave vehicle jammer so as to mask the signal received from the target vehicle at the threat radar is calculated using the formula:

$$Ds = 2B - 2Ddo$$

9. The system of claim 6 wherein Dp, the doppler shift given to the jammer transmission from the slave vehicle so as to match the doppler of the target vehicle as received by the threat radar is calculated using the formula:

$$Dp = dB/dt - Df$$

10. The system of claim 6 wherein C, the distance between the target vehicle and the threat radar is calculated using the formula:

$$C = Ddo(2B - Ddo)/[2B(Cos < A - 1) + 2Ddo]$$

where A is the angle measured from the target vehicle between the threat radar and the slave vehicle.

11. System of claim 6 wherein Ds and Dp are calculated using the formulas:

$$Ds = 2B - 2Ddo$$

$$Dp = \frac{dB}{dt} - Df$$

12. The system of claim 6 which additionally includes means for continuously monitoring the radar signal retransmitted from the slave, said means including means for subtracting Ds and Ddf to permit continuous measurement of Df and Ddo and means for calculating with respect to each threat radar signal the shift in doppler (Ds) and the time delay (Ddf) of a radar signal sent from the slave to provide a signal which is coincident with that from the target in both time and frequency but at a false angle so as to mask the target signal.

* * * * *